United States Patent
Mizushima et al.

(10) Patent No.: US 10,236,753 B2
(45) Date of Patent: Mar. 19, 2019

(54) METHOD OF MANUFACTURING ASSEMBLED CONDUCTOR AND ELECTRIC MOTOR

(71) Applicant: TOYOTA JIDOSHA KABUSHIKI KAISHA, Toyota-shi, Aichi-ken (JP)

(72) Inventors: Daisuke Mizushima, Toyota (JP); Toshiaki Masui, Okazaki (JP); Hironari Adachi, Toyota (JP); Hirofumi Inoshita, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 256 days.

(21) Appl. No.: 15/036,120

(22) PCT Filed: Nov. 20, 2014

(86) PCT No.: PCT/IB2014/002516
§ 371 (c)(1),
(2) Date: May 12, 2016

(87) PCT Pub. No.: WO2015/075536
PCT Pub. Date: May 28, 2015

(65) Prior Publication Data
US 2016/0276910 A1 Sep. 22, 2016

(30) Foreign Application Priority Data
Nov. 22, 2013 (JP) .................. 2013-241813

(51) Int. Cl.
*H02K 15/04* (2006.01)
*H01B 13/02* (2006.01)
(Continued)

(52) U.S. Cl.
CPC ......... *H02K 15/0435* (2013.01); *D07B 7/027* (2013.01); *H01B 13/0285* (2013.01);
(Continued)

(58) Field of Classification Search
CPC .......... D07B 7/027; D07B 1/147; D07B 5/12; D07B 2201/2004; D07B 2401/2015;
(Continued)

(56) References Cited

U.S. PATENT DOCUMENTS 5,133,121 A * 7/1992 Birbeck ............ H01B 13/0285
174/126.1
2002/0050395 A1* 5/2002 Kusumoto ............... H02K 3/12
174/128.2

(Continued)

FOREIGN PATENT DOCUMENTS

JP  H10-112228 A   4/1998
JP  2009-199749 A  9/2009
(Continued)

*Primary Examiner* — Naishadh N Desai
(74) *Attorney, Agent, or Firm* — Oliff PLC

(57) ABSTRACT

A method of manufacturing an assembled conductor includes: arranging a plurality of peripheral wires having anisotropic cross-sectional shapes around a central wire; bundling the central wire and the peripheral wires that have been arranged, to form a conducting wire bundle; and rolling the conducting wire bundle to form the assembled conductor. The arranging includes a bending process for bending the plurality of peripheral wires in directions along imaginary lines that extend radially relative to an axis of the central wire on an imaginary plane intersecting the axis of the central wire.

7 Claims, 15 Drawing Sheets

(51) Int. Cl.
*D07B 7/02* (2006.01)
*H01B 13/08* (2006.01)
*H01B 13/00* (2006.01)
*D07B 1/14* (2006.01)
*D07B 5/12* (2006.01)

(52) U.S. Cl.
CPC ......... *H01B 13/0883* (2013.01); *H02K 15/04* (2013.01); *D07B 1/147* (2013.01); *D07B 5/12* (2013.01); *D07B 2201/2004* (2013.01); *D07B 2401/2015* (2013.01); *H01B 13/0006* (2013.01)

(58) Field of Classification Search
CPC ............ H01B 13/0285; H01B 13/0883; H01B 13/08; H01B 13/0006; H02K 15/04; H02K 15/0435
USPC .................................................. 310/179–210
See application file for complete search history.

(56) References Cited

U.S. PATENT DOCUMENTS

| | | | | |
|---|---|---|---|---|
| 2008/0193753 | A1* | 8/2008 | Nutter | E04C 5/012 428/364 |
| 2010/0176688 | A1* | 7/2010 | Jin | A61B 8/00 310/327 |
| 2010/0320995 | A1* | 12/2010 | David | H05H 3/04 324/72 |
| 2012/0261106 | A1* | 10/2012 | Kelly | F28F 3/022 165/185 |
| 2016/0027559 | A1 | 1/2016 | Masui et al. | |

FOREIGN PATENT DOCUMENTS

| | | |
|---|---|---|
| JP | 2014-212052 A | 11/2014 |
| JP | 2015-050083 A | 3/2015 |

* cited by examiner

METHOD OF MANUFACTURING ASSEMBLED CONDUCTOR AND ELECTRIC MOTOR

BACKGROUND OF THE INVENTION

1. Field of the Invention

The invention relates to a method of manufacturing an assembled conductor and an electric motor.

2. Description of Related Art

There exist anisotropic wires having anisotropies in which cross-sectional shapes change by means of rotation. In addition, there exists a stranded conductor formed by intertwisting the anisotropic wires. Such a stranded conductor is manufactured by various manufacturing methods.

For example, the stranded conductor disclosed in Japanese Patent Application Publication No. 10-112228 (JP 10-112228 A) is manufactured by adjusting the position of the intertwisting opening to stabilize the posture of the stranded conductor.

However, an assembled conductor having a high occupation efficiency is required. If the manufacturing method disclosed in JP 10-112228 A is used to manufacture the assembled conductor, distortional deformations may be applied to the anisotropic wires, so that the anisotropic wires are made to undergo torsions, thereby gaps, are generated between the anisotropic wires. As a result, the occupation efficiency of the obtained assembled conductor may become low.

SUMMARY OF THE INVENTION

Thus, the invention provides a manufacturing method capable of manufacturing an assembled conductor having a high occupation efficiency against torsions of anisotropic wires.

A first aspect of the invention relates to a method of manufacturing an assembled conductor. The method of manufacturing an assembled conductor includes: arranging a plurality of peripheral wires having anisotropic cross-sectional shapes around a central wire; bundling the central wire and the peripheral wires that have been arranged, to form a conducting wire bundle; and rolling the conducting wire bundle to form the assembled conductor. The arranging includes a bending process for bending the plurality of peripheral wires in directions along imaginary lines that extend radially relative to an axis of the central wire on an imaginary plane intersecting the axis of the central wire.

According to this aspect, an assembled conductor having a high occupation efficiency can be manufactured against torsions of anisotropic wires.

In addition, in the method, the bending process may be a second bending process. The arranging may further include a first bending process of bending the plurality of peripheral wires that are arranged in a line in directions intersecting the radially extending imaginary lines before the second bending process, and in the second bending process, the plurality of peripheral wires may be bent at positions where the peripheral wires intersect the imaginary lines. In addition, in the method, the arranging may further include a third bending process of bending the plurality of peripheral wires from positions on the radially extending imaginary lines toward the axis of the central wire, after the second bending process. In addition, in the method, in the first bending process, one or more peripheral wires included in the plurality of peripheral wires may be bent in a first direction of the imaginary plane, and the remaining peripheral wires included in the plurality of peripheral wires may be bent in a second direction opposite to the first direction. In addition, in the method, in at least one of the processes for bending the peripheral wires, rollers may be used to bend the peripheral wires. In addition, the method may further, include machining the cross-sectional shapes of the peripheral wires into the anisotropic cross-sectional shapes before the arranging, and the anisotropic cross-sectional shapes are trapezoidal shapes. In addition, in the method, the plurality of peripheral wires are wound around bobbins and are supplied from the bobbins, before the machining the cross-sectional shapes of the peripheral wires into the anisotropic cross-sectional shapes.

On the other hand, a second aspect of the invention relates to an electric motor. The electric motor has a coil formed by the assembled conductor manufactured by the above manufacturing method.

According to the first and second aspects of the invention, a manufacturing method capable of manufacturing an assembled conductor having a high occupation efficiency against torsions of anisotropic wires and an electric motor can be provided.

BRIEF DESCRIPTION OF THE DRAWINGS

Features, advantages, and technical and industrial significances of exemplary embodiments of the invention will be described below with reference to the accompanying drawings, in which like numerals denote like elements, and wherein.

DETAILED DESCRIPTION OF EMBODIMENTS

Embodiment 1

Figure 1:
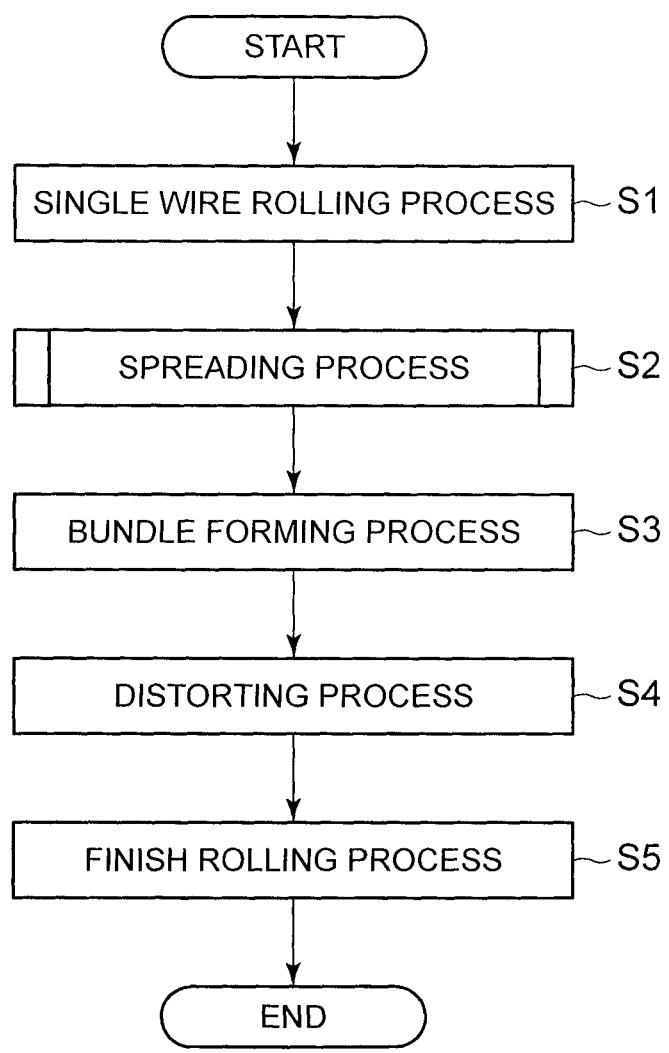
FIG. 1 is a flow chart of the manufacturing method of Embodiment 1 of the invention.
Figure 2:
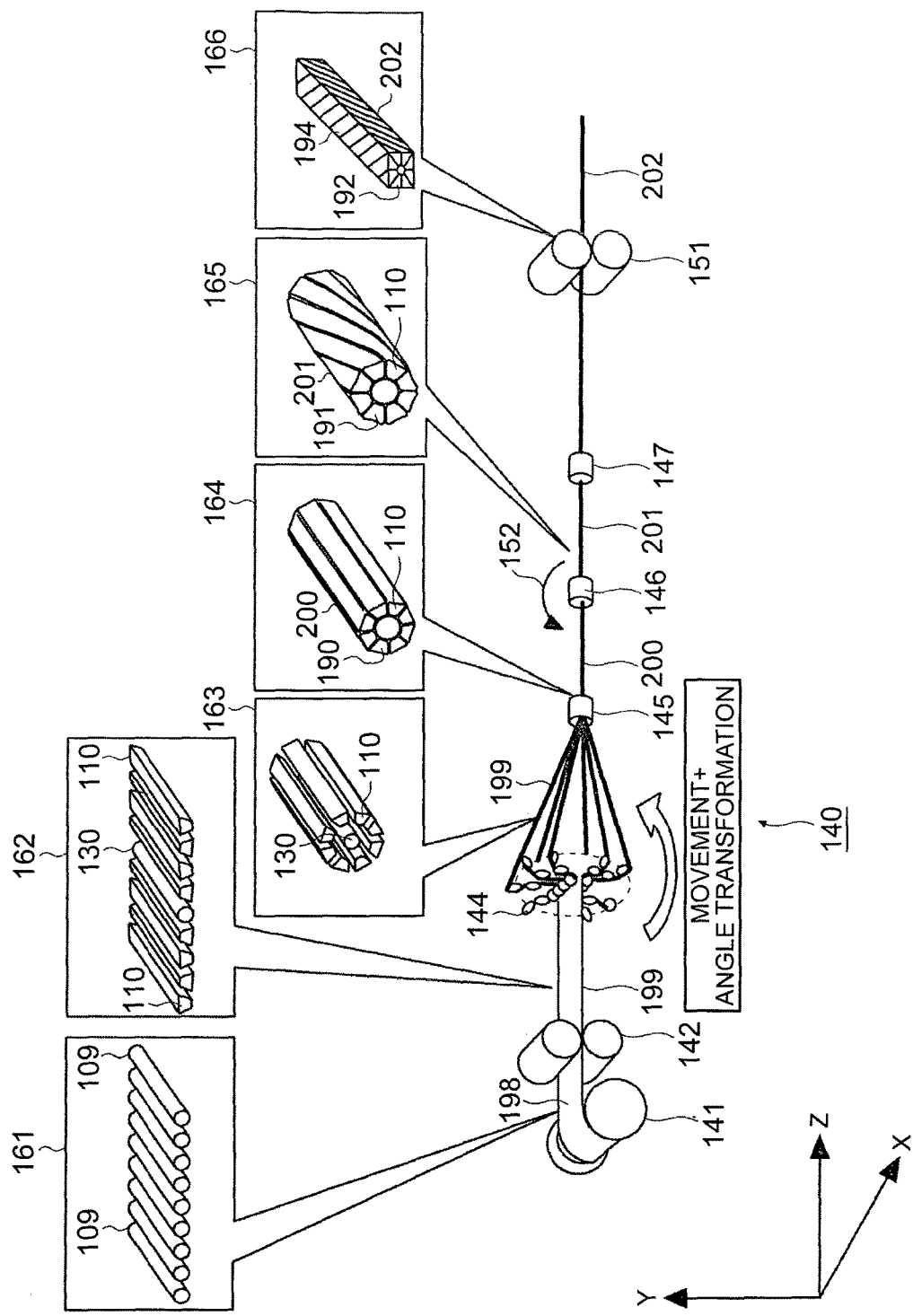
FIG. 2 is a schematic diagram of the manufacturing method of Embodiment 1 of the invention.

The manufacturing method of Embodiment 1 is described with reference to FIGS. 1 and 2. FIG. 1 is a flow chart of the manufacturing method of Embodiment 1. FIG. 2 is a schematic diagram of the manufacturing method of Embodiment 1. Here, a manufacturing method of continuously manufacturing an assembled conductor 202 from a conductor wire group 198 by using a manufacturing device 140 is described. In FIG. 2, the conductor wire group 198 is schematically shown to be, in a state in which conductor wires 109 are arranged in a direction from an inner side of a paper plane toward an outer side of the paper plane.

As shown in FIG. 2, a wire supplying machine 141 transports the conductor wire group 198 to first rollers 142. As shown in the schematic diagram designated by 161, the conductor wires 109 are linear bodies having substantially round cross-sectional shapes. The conductor wires 109 are parts of the conductor wire group 198 for forming peripheral wires 110.

The first rollers 142 receive the conductor wire group 198 from the wire supplying machine 141, and as shown in the schematic diagram designated by 162, the conductor wires 109 of the conductor wire group 198 are plastically deformed to form the peripheral wires 110 (single wire rolling process S1). Here, it is permitted as long as, the cross-sectional shapes of the peripheral wires 110 are deformed from round shapes having isotropies in which the cross-sectional shapes do not change by means of rotation to anisotropic cross-sectional shapes having anisotropies in which the cross-sectional shapes change by means of rotation, for example, to trapezoidal shapes having upper and lower sides of different lengths. As anisotropic cross-sectional shapes, a trapezoidal shape, a sector shape, an arc shape, a triangle shape and the like, for example, can be listed. In addition, respective wires within a wire group 199 composed of the peripheral wires 110 and a central wire 130 are arranged in a line. That is, the respective wires of the wire group 199 are configured to be arranged in a row in a direction perpendicular to an output direction of the wire group 199 (a length direction of each of the wires included in the wire group 199). To be more specific, in the peripheral wires 110, the wires are configured in a manner that planes corresponding to the upper sides of the trapezoidal shapes and planes corresponding to the lower sides of the trapezoidal shapes are arranged alternately.

The first rollers 142 have a pair of rollers, which are rotated by means of a driving mechanism not shown in the figure, and transport the wire group 199 to a conveying device 144. Such a wire group 199 is schematically shown to be in a state in which the respective wires are arranged in a row in a direction from an inner side of the paper plane toward an outer side of the paper plane.

The conveying device 144 receives the wire group 199 from the first rollers 142. The conveying device 144 spreads each of the wires of the wire group 199 to form a positional relationship in which the peripheral wires 110 surround the central wire 130. To be more specific, as shown in the schematic diagram designated by 163, the peripheral wires 110 are configured radially by taking the central wire 130 as the center (spreading process S2). In this case, each of the peripheral wires 110 is configured in a manner that the area of the outer peripheral surface is larger than the area of the inner peripheral surface. That is, they are configured in a manner that the one of the upper and lower sides of the trapezoidal shape having a longer length is located on the outer side, and the one having a shorter length is located on the inner side in the cross section of each of the peripheral wires 110. In addition, detailed contents relating to the spreading process S2 are described below.

In addition, the conveying device 144 adjusts the positions and orientations of the peripheral wires 110 in a manner that the inner peripheral surfaces of the peripheral wires 110 face the respective sides of the central wire 130. That is, the inner peripheral surfaces of the peripheral wires 110 are required to follow the outer peripheral surface of the cylindrical central wire 130, so the wire group 199 conveyed in a manner that a plane including the upper sides of the respective peripheral wires 110 is parallel to a plane including the lower sides of the respective peripheral wires 110 is required to be configured by means of an angle transformation in a manner that the wire group 199 is perpendicular to imaginary lines that extend radially outwards from the central wire 130. The conveying device 144 transports the wire group 199 to a clamp 145.

Next, the clamp 145 receives the wire group 199 from the conveying device 144. The clamp 145 arranges the wire group 199 to form assembled conducting wires, which are formed by arranging the peripheral wires 110 around the central wire 130 and bundling them, i.e., an assembled conducting wire bundle 200 (bundle forming process S3). In addition, the clamp 145 forms the assembled conducting wire bundle 200 in a manner that the internal peripheral surfaces of the peripheral wires 110 are opposed to the respective sides of the outer surface of the central wire 130.

The clamp 145 applies a prescribed pressure to the assembled conducting wire bundle 200 in a direction toward the center of the assembled conducting wire bundle 200. Thus, as shown in the schematic diagram designated by 164, in a cross section 190 of the assembled conducting wire bundle 200, the central wire 130 and the peripheral wires 110 approach each other, and the peripheral wires 110 approach each other. The assembled conducting wire bundle 200 is made to pass through the clamp 145 and a rotary machine 146, and then the assembled conducting wire bundle 200 is transported to a clamp 147.

The clamp 145, the rotary machine 146 and the clamp 147 clamp the assembled conducting wire bundle 200 and fix an axis of the assembled conducting wire bundle 200. Moreover, in a state in which the clamp 145, the rotary machine 146 and the clamp 147 clamp the assembled conducting wire bundle 200, the rotary machine 146 rotates in a prescribed rotation direction 152 and distorts the assembled conducting wire bundle 200 (distorting process S4). Consequently, a distorted assembled conductor 201 is formed. Here, the distorted assembled conductor 201 takes the rotary machine 146, for example, as the boundary, and has a distorted portion that is distorted in a manner that a spiral is depicted by using the central wire 130 as an axis and a reverse distorted portion that is distorted in a direction opposite to the direction in which the distorted portion is distorted. In addition, the distorted assembled conductor 201 can also have a non-distorted portion parallel to the axis of the central wire 130 between the distorted portion and the reverse distorted portion.

As shown in the schematic diagram designated by 165, the distorted assembled conductor 201 is an assembled conductor formed by arranging the central wire 130 and the peripheral wires 110 having prescribed shapes. Thus, the rotary machine 146 can form a cross section 191 that maintains a substantive round shape of the cross section 190.

The clamp 147 applies a prescribed pressure to the distorted assembled conductor 201 in a direction toward the center of the distorted assembled conductor 201. Thus, the central wire 130 and the peripheral wires 110 are close to each other, and the peripheral wires 110 are close to each other.

Second rollers 151 receive the distorted assembled conductor 201 from the clamp 147. The second rollers 151 have a pair of rollers, which are rotated by means of a driving mechanism not shown in the figure, and substantively apply a planar pressure in a up-down direction in the figure when the distorted assembled conductor 201 is formed into a substantive cuboid shape (finish rolling process S5).

As shown in the schematic diagram designated by 166, the second rollers 151 provide transverse wall surfaces 194 for the upper and lower ends of the cross section 192 of the assembled conductor 202 in the figure. The second rollers 151 can also transport the assembled conductor 202 to a heating process and a coil manufacturing process according to requirements.

If the above processes are undergone, the assembled conductor 202 is manufactured.

Figure 3:
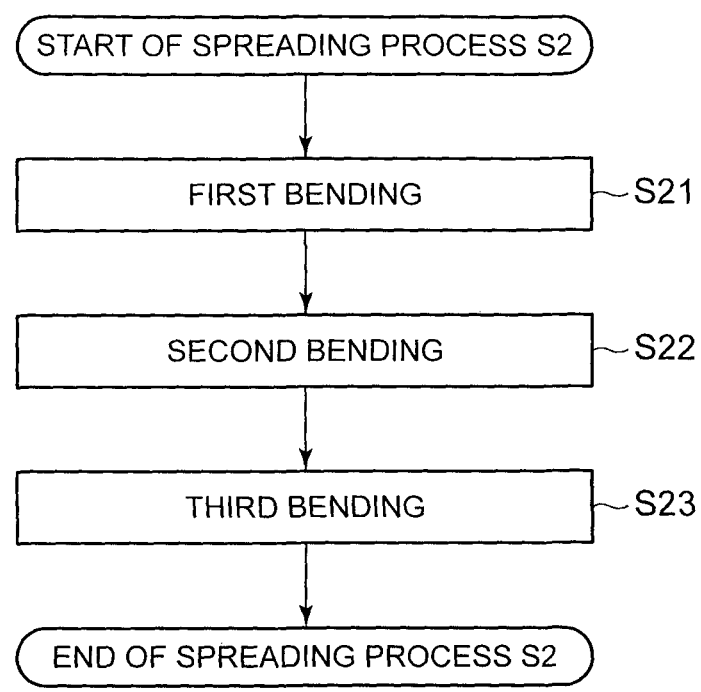
FIG. 3 is a flow chart of one process of the manufacturing method of Embodiment 1 of the invention.

Next, FIGS. 3-8 are used to describe the detailed contents of the spreading process S2 in the above manufacturing method of Embodiment 1. Here, the conveying device 144 is used to radially arrange the peripheral wires 110. FIG. 3 shows a flow chart of one process of the manufacturing method of Embodiment 1. FIGS. 4-8 show schematic diagrams of one process of the manufacturing method of Embodiment 1. In addition, in FIGS. 4-8, an XYZ rectangular coordinate system is determined.

Figure 4:
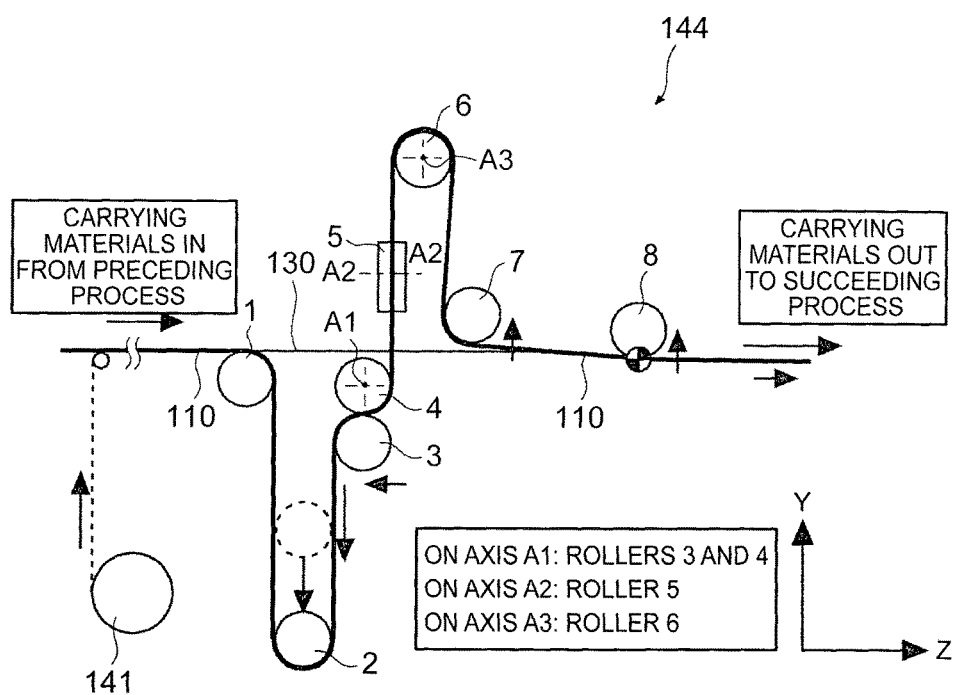
FIG. 4 is a schematic diagram of one process of the manufacturing method of Embodiment 1 of the invention.
Figure 5:
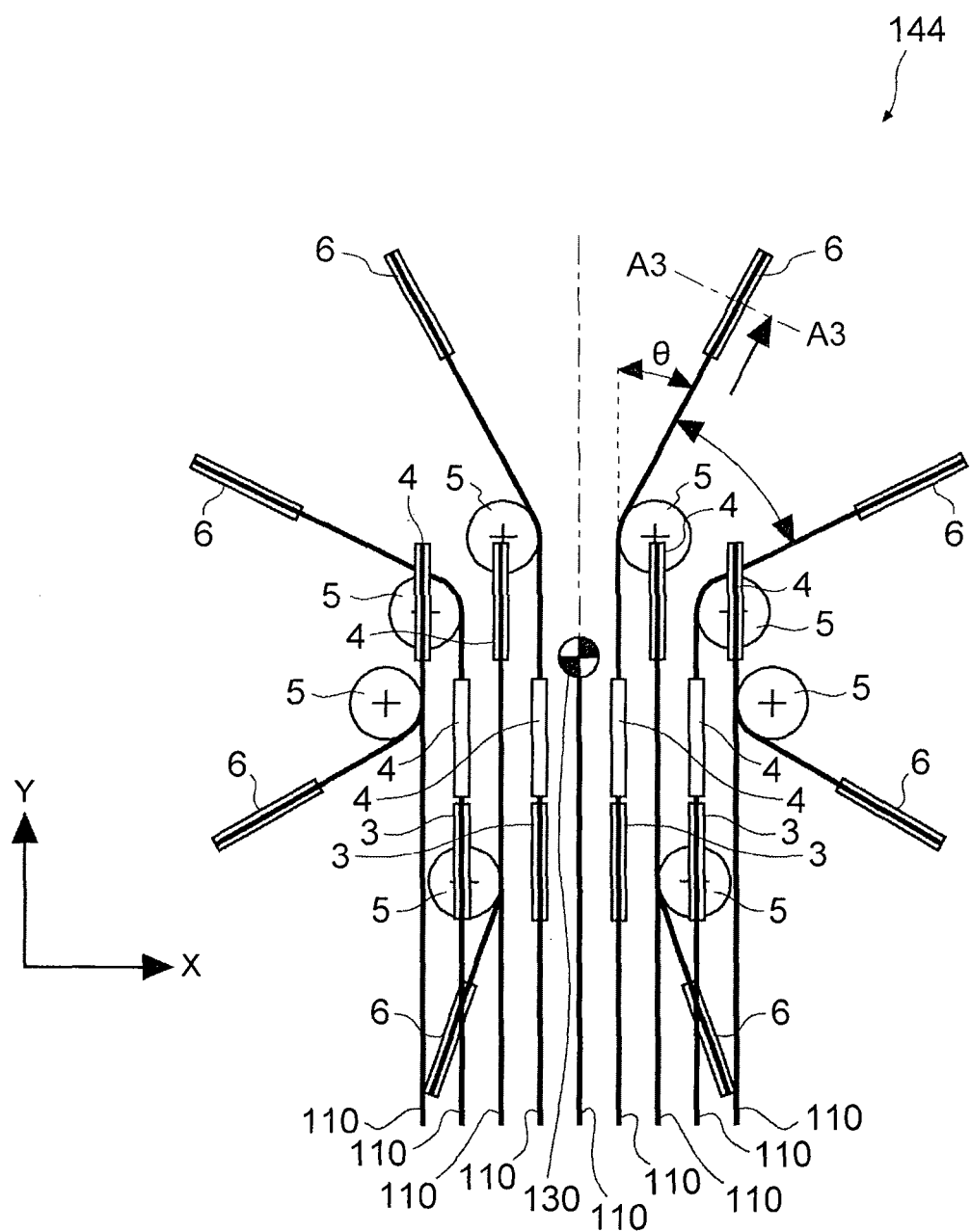
FIG. 5 is a schematic diagram of one process of the manufacturing method of Embodiment 1 of the invention.

As shown in FIGS. 4 and 5, the conveying device 144 includes rollers 1-8 for respectively performing angle transformations and conveyances with respect to eight peripheral wires 110. Here, to be specific, FIG. 4 is a schematic diagram when the conveying device 144 is observed from the side. In addition, FIG. 5 is a schematic diagram when the conveying device 144 is observed from the first rollers 142 along the axis of the central wire 130. In addition, FIG. 4 only illustrates the rollers 1-8 for conveying one peripheral wire 110 and performing an angle transformation thereof. The axis of the central wire 130 is parallel to the direction of the axis Z. In addition, the direction in which the peripheral wire 110 proceeds is parallel to the axis Z. The rollers 1-4 and 6-8 are disposed in a manner that the main surfaces thereof are arranged along the YZ plane. The roller 5 is disposed in a manner that the main surface thereof is arranged along the XY plane. The roller 4 rotates by taking the axis A1 as the center, and the rollers 5 and 6 rotate by taking the axes A2 and A3 as the centers, respectively.

The rollers 1 and 2 receive the peripheral wires 110 from the first rollers 142 (see FIG. 2). The roller 2 moves in the up-down direction to adjust the conveying speed of the peripheral wires 110. In addition, the rollers 1 and 2 transport the peripheral wires 110 to the rollers 3 and 4. In addition, the rollers 1 and 2 can be omitted according to requirements.

Figure 6:
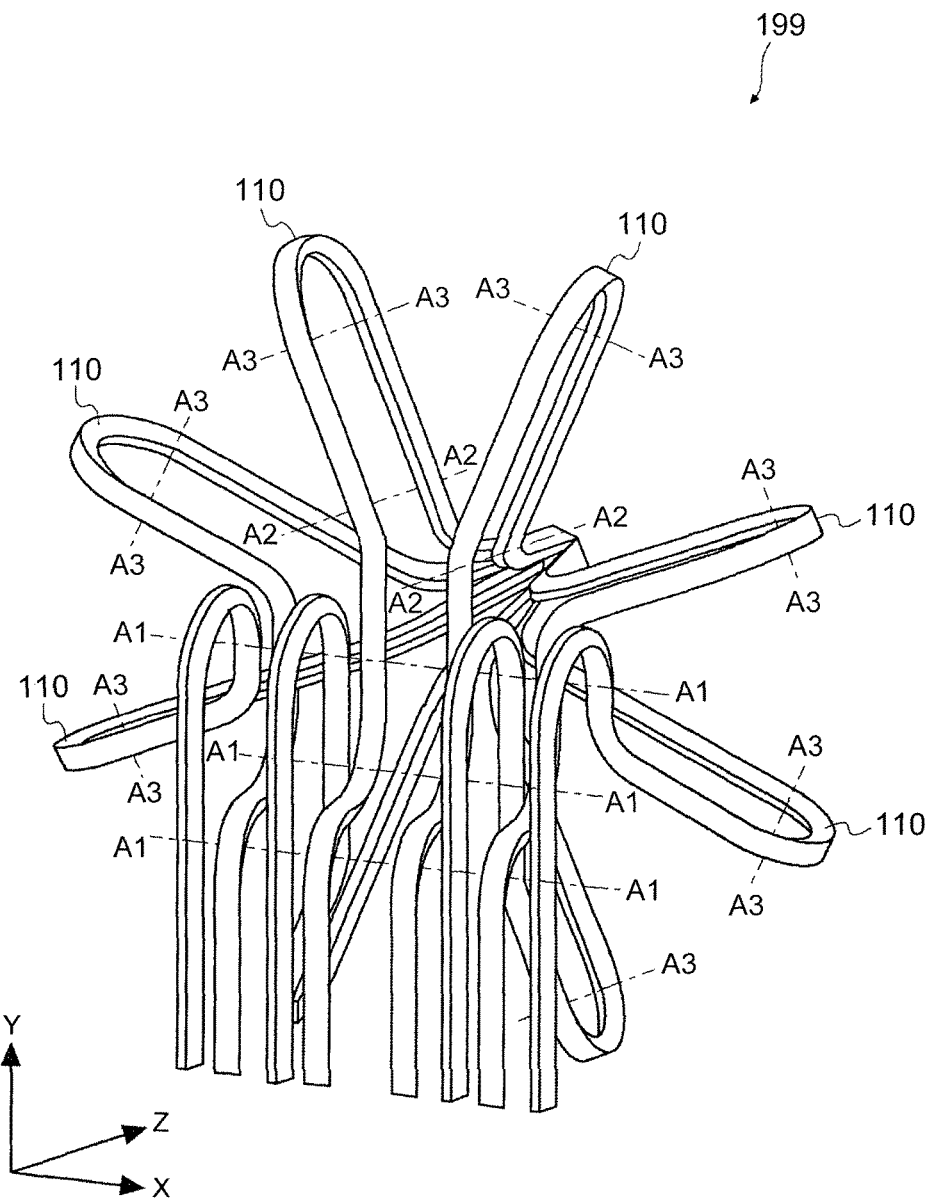
FIG. 6 is a schematic diagram of one process of the manufacturing method of, Embodiment 1 of the invention.
Figure 8:
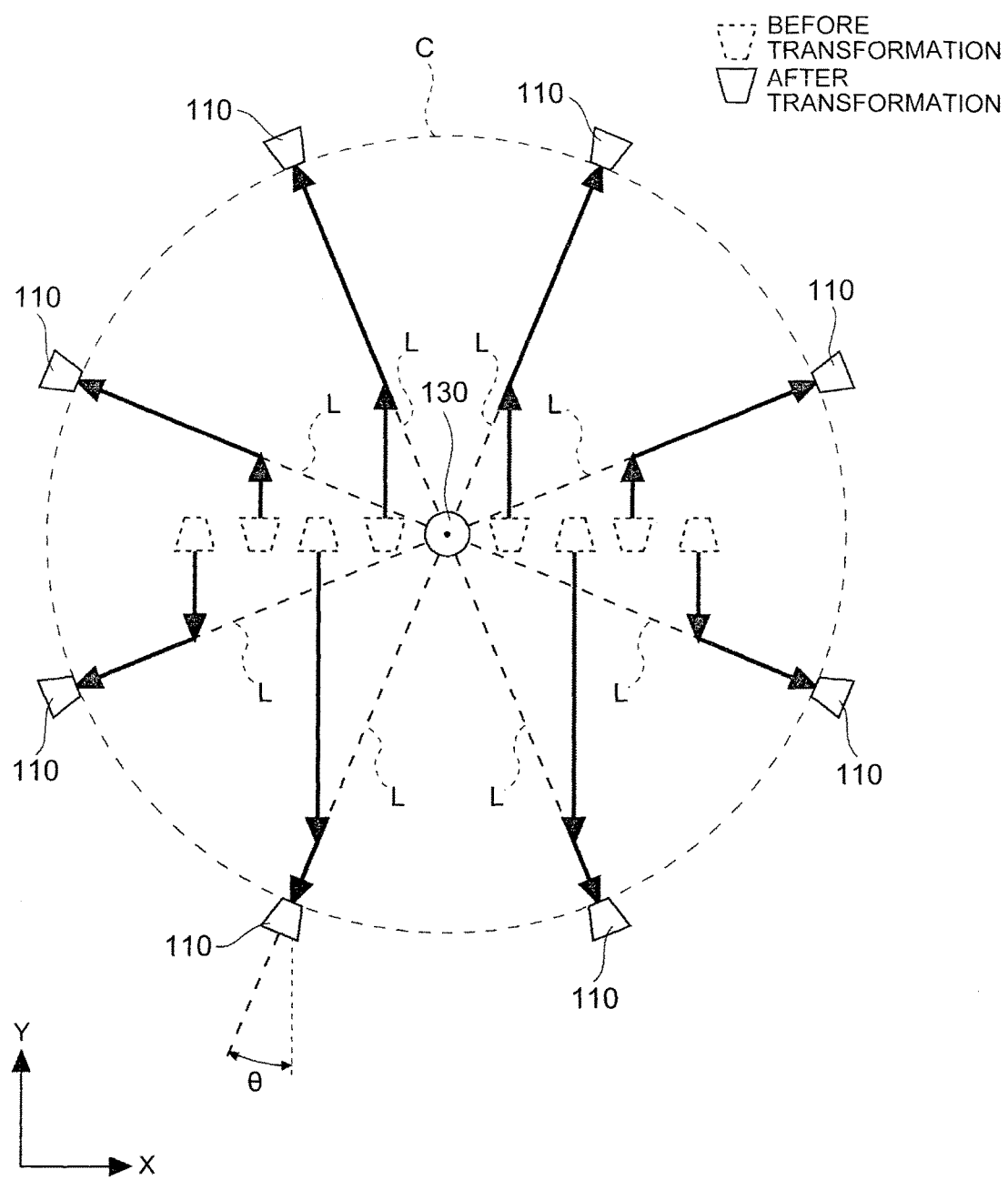
FIG. 8 is a schematic diagram of one process of the manufacturing method of Embodiment 1 of the invention.

Next, if reference is made by taking FIG. 8 into consideration, the rollers 3 and 4 receive the peripheral wire 110 from the rollers 1 and 2, and bend the peripheral wire 110 in a direction intersecting the radial direction, i.e., an imaginary line L that extends radially outwards from the central wire 130 (first bending process S21). In the first bending process S21 based on these rollers 3 and 4, the peripheral wire 110 is not distorted in a manner that it rotates by taking its axis as the center, but is bent. Moreover, the rollers 3 and 4 transport the peripheral wires 110 to the roller 5. As shown in FIG. 6, the peripheral wires 110, starting from the state in which they are arranged in a line, are adjusted in terms of their orientations by the rollers 3 and 4 (not shown in the figure) which rotate around the axis A1. In addition, the rollers 3-6 are not shown in FIG. 6. In addition, in the example as shown in FIG. 4, although the axis A1 of the roller 4 is located below the axis of the central wire 130, the axis A1 of the roller 4 can be also located above the axis of the central wire 130. In addition, in FIGS. 5 and 6, the peripheral wires 110 are illustrated in a manner that the peripheral wires 110 proceed along the direction of the axis Y to arrive at the rollers 3 and 4 for an easy understanding, but the peripheral wires 110 proceed along the direction of the axis Z to arrive at the rollers 3 and 4.

Next, the roller 5 receives the peripheral wire 110 from the rollers 3 and 4, and bends the peripheral wire 110 along the radial direction, i.e., an imaginary line L that extends radially outwards from the central wire 130 (second bending process S22). At a position where the peripheral wire 110 intersects the imaginary line L, the peripheral wire 110 is bent. In the second bending process S22 based on the roller 5, a so-called angle transformation is performed. Here, as shown in FIG. 5, the bending angle of the peripheral wire 110 is preferably a target angle $\theta$. As shown in FIGS. 5 and 6, the peripheral wires 110, starting from the state in which they are arranged in a line, are bent by the roller 5 (not shown in the figure) which rotates around the axis A2. In this example, by means of the bending based on the roller 5, the peripheral wires 110 are bent by the target angle $\theta$ on the XY plane, but the surface facing toward the direction Z before the bending also faces toward the direction Z after the bending, and does not undergo the so-called distortion. The roller 5 transports the peripheral wires 110 to the roller 6.

Next, the roller 6 receives the peripheral wires 110 from the roller 5. As shown in FIG. 8, the peripheral wires 110 are respectively conveyed by the conveying device 144 and undergo angle transformations to be arranged radially from being arranged in a line. To be specific, the peripheral wires 110 are bent in directions intersecting the imaginary lines L that extend radially outwards from the central wire 130 (first bending process S21), and the peripheral wires 110 are bent along the imaginary lines L at positions where the peripheral wires 110 intersect the imaginary lines L (second bending process S22), so that the peripheral wires 110 are configured radially by taking the axis of the central wire 130 as the center. In addition, the peripheral wires 110 are uniformly arranged on an outer edge of an imaginary circle C (herein a perfect circle) by taking the axis of the central wire 130 as the center on, for example, an imaginary plane (herein the XY plane) intersecting the axis of the central wire 130. Moreover, the cross-sectional shape, i.e., the trapezoidal shape, of the peripheral wire 110, has its upper and lower sides which respectively undergo angle transformations in a manner that the upper and lower sides are perpendicular to the imaginary lines that extend radially outwards from the axis of the central wire 130.

Finally, as shown in FIG. 4, the roller 6 bends the peripheral wires 110 toward the axis of the central wire 130 (third bending process S23). In addition, the rollers 7 and 8 bend the peripheral wires 110 in a manner that the peripheral wires 110 approach the axis of the central wire 130, and transport them to the clamp 145 (see FIG. 2).

Detailed contents of the rollers 3-6 are described herein. If a coordinate of a target position is set to (X, Y, Z), as shown in Table 1, centers of axes, directions of axes and roller radii of the rollers 3-6 are respectively shown.

TABLE 1

| Name of Axis | Center of Axis | Direction of Axis | Roller Radius |
|---|---|---|---|
| Axis A1 | (0, t/2 + R1, z1) | (1, 0, 0) | R1 |
| Axis A2 | (w/2 + R2, y2, 0) | (0, 0, 1) | R2 |
| Axis A3 | (x3, y3, z1 + t + R1 + R3) | (cos θ, sin θ, 0) | R3 |

$Y - X*\tan^{-1}\theta = y2$ ... (Mathematic Expression 1)
$z1 + R1 + R3 = Z$ ... (Mathematic Expression 2)

Figure 7:
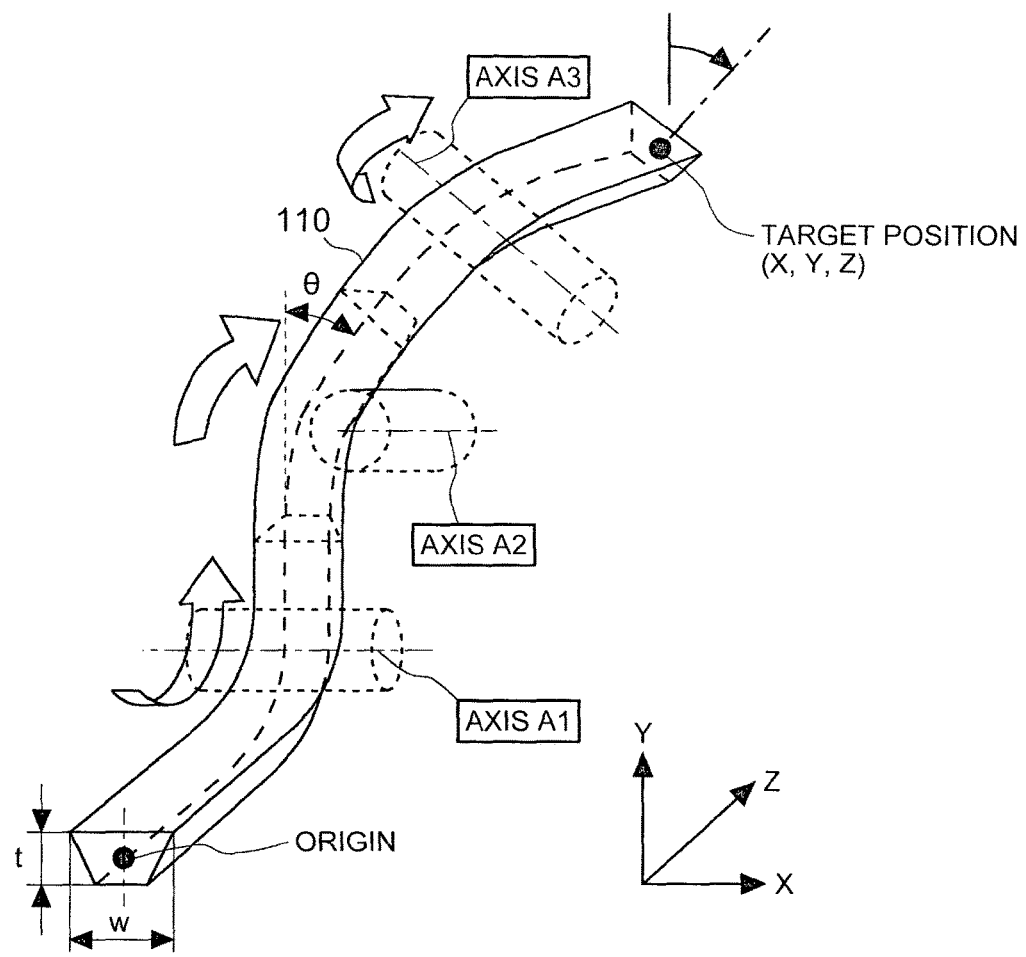
FIG. 7 is a schematic diagram of one process of the manufacturing method of Embodiment 1 of the invention.

Here, R1, R2 and R3 are arbitrary values. As shown in FIG. 7, t is the thickness of the peripheral wire 110, w is the width of the peripheral wire 110, θ is the target angle when an angle transformation is performed with respect to the peripheral wire 110, and x3 and y3 can take arbitrary values.

Figure 9:
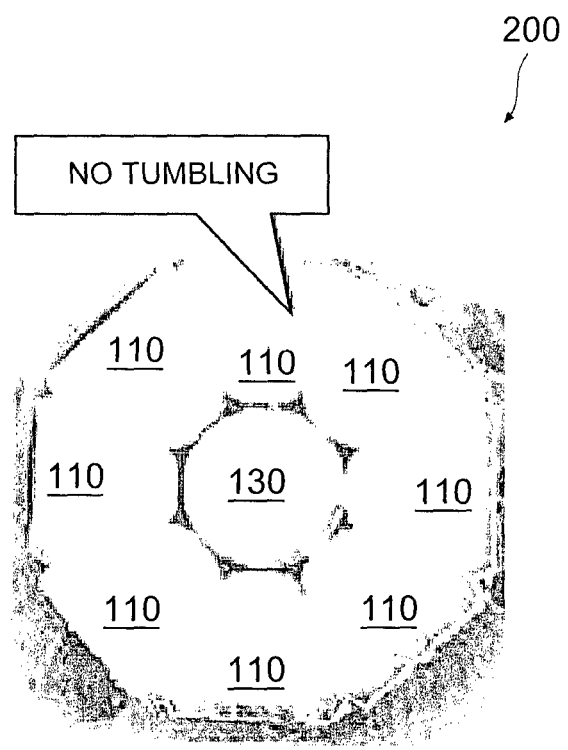
FIG. 9 is a sectional view of the assembled conducting wire bundle of the manufacturing method of Embodiment 1 of the invention.
Figure 10:
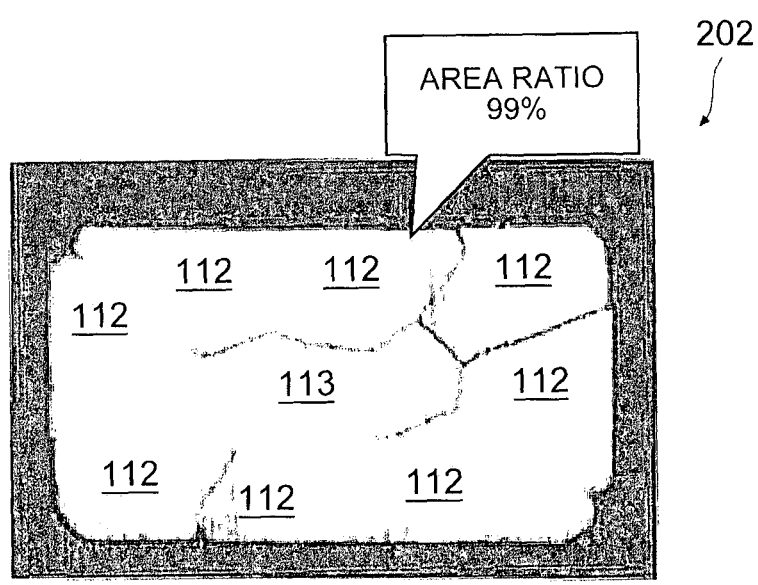
FIG. 10 is a sectional view of the assembled conductor of the manufacturing method of Embodiment 1 of the invention.

Next, FIGS. 9 and 10 are used to describe the assembled conducting wire bundle and the assembled conductor obtained by the above manufacturing method of Embodiment 1.

As shown in FIG. 9, there is hardly any tumbling caused by distortion, i.e., torsion, in the peripheral wires 110 of the assembled conducting wire bundle 200. In addition, the gap between the peripheral wires 110 of the assembled conducting wire bundle 200 is small. It can be deemed that this is because that the occurrence of the distortional deformation is inhibited.

As shown in FIG. 10, hardly any gap exists between the central wire 113 and the peripheral wires 112 as well as between the peripheral wires 112 of the assembled conductor 202. The central wire 113 and the peripheral wires 112 are close to each other, and the peripheral wires 112 are close to each other. The area ratio of the central wire 113 and the peripheral wires 112 in the cross-sectional area of the assembled conductor 202 reaches up to 99%. If the above manufacturing method of Embodiment 1 is used, an assembled conductor having a high occupation efficiency is obtained.

Hereinbefore, according to the manufacturing method of Embodiment 1, the peripheral wires can be bent and undergo conveyances and angle transformations to inhibit torsions of the peripheral wires to thereby obtain an assembled conducting wire bundle having a small gap between the peripheral wires. Moreover, a rolling machining can be performed with respect to the obtained assembled conducting wire bundle to obtain an assembled conductor having a high occupation efficiency.

In addition, according to the manufacturing method of Embodiment 1, the peripheral wires are bent and configured radially to be supplied to, the bundle forming process. Thus, the occurrence of distortional deformations in the peripheral wires is inhibited, and the postures of the peripheral wires in the bundle forming process are stable to inhibit the occurrence of torsions. In addition, multiple bending deformations can be applied to the peripheral wires to relieve residual stresses of the peripheral wires. In addition, the mechanism of the residual stresses is described below.

In addition, according to the manufacturing method of Embodiment 1, the peripheral wires have substantially trapezoidal cross-sectional shapes. Thus, the peripheral wires can be easily arranged around the central wire to inhibit the generation of the gap between the peripheral wires, and obtain an assembled conducting having a high occupation efficiency more reliably.

However, there exists a method of manufacturing an assembled conductor including a distortion angle transforming process. The distortion angle transforming process uses pinch rollers to guide the peripheral wires, applies a distortional deformation in order to change the distortion angle to a target angle, and meanwhile performs a conveyance and angle transformation. This method of manufacturing an assembled conductor is different from the method of manufacturing an assembled conductor of Embodiment 1, for the spreading process S2 is replaced and a distortion angle transformation process is included. That is, this method of manufacturing an assembled conductor includes the single wire rolling process S1, the distortion angle transforming process, the bundle forming process S3, the distorting process S4 and the finish rolling process S5.

Figure 13:
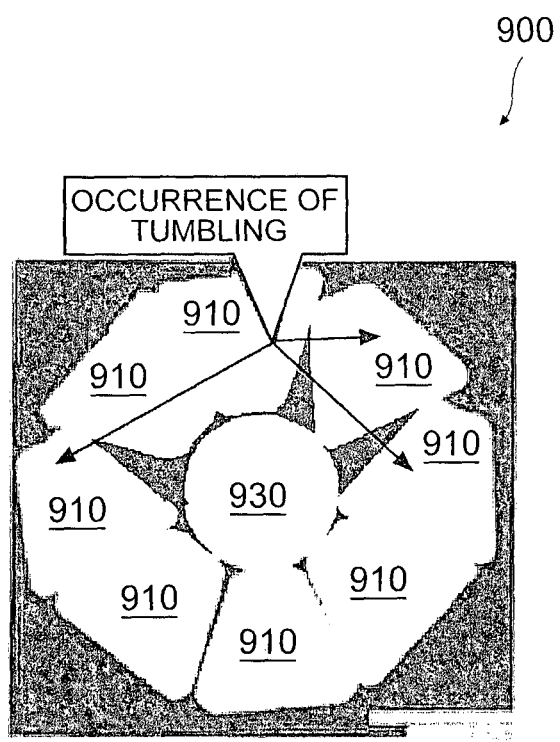
FIG. 13 is a sectional view of an associated assembled conducting wire bundle.

In such a manufacturing method, distortional deformations are applied to the peripheral wires. To be specific, firstly, if the conductor wire group 198 (see FIG. 2) undergoes the single wire rolling process S1, the distortion angle transforming process and the bundle forming process S3, an assembled conducting wire bundle 900 is obtained. As shown in FIG. 13, in the assembled conducting wire bundle 900, the peripheral wires 910 undergo torsions, thereby a large gap is generated between the peripheral wires 910.

Figure 14:
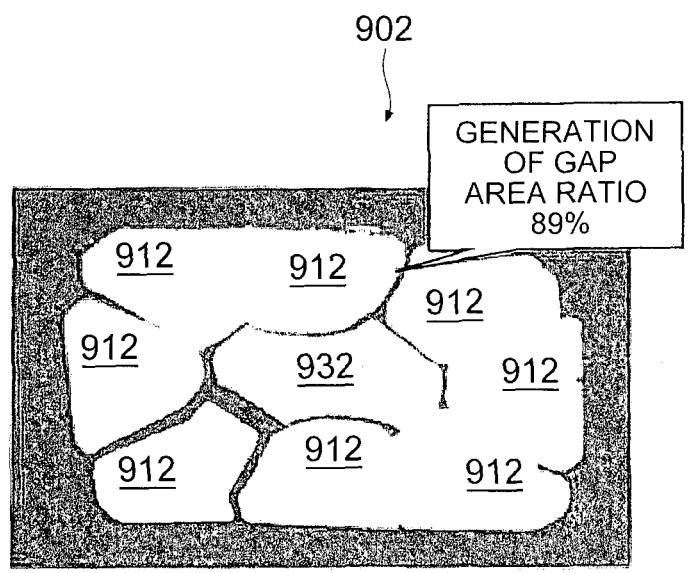
FIG. 14 is a sectional view of an associated assembled conductor.

In addition, if the assembled conducting wire bundle 900 undergoes the distorting process S4 and then undergoes the finish rolling process S5, an assembled conductor 902 is obtained. To be specific, in the distorting process S4, the balance of forces between the peripheral wires 910 breaks down, as shown in FIG. 13, and the peripheral wires 910 pointed to by the arrows in the peripheral wires 910 are distorted in a state in which the peripheral wires 910 have undergone torsions. Next, in the finish rolling process S5, the assembled conducting wire bundle 900 is rolled to obtain the assembled conductor 902 as shown in FIG. 14. The area ratio of a central wire 932 and peripheral wires 912 in the cross section of the assembled conductor 902 is as low as 89%. That is, even as compared with such a manufacturing method, the manufacturing method of Embodiment 1 can also inhibit the occurrence of the distortional deformations, and meanwhile make the peripheral wires undergo angle transformations by taking the axes thereof as the centers to thereby manufacture an assembled conductor having a high occupation efficiency.

In addition, as compared with such a manufacturing method, the manufacturing method of Embodiment 1 has a shorter linear distance between manufacturing devices. According to the manufacturing method of Embodiment 1, a freedom of configuration of a production line is comparatively highly obtained to achieve compactness of the manufacturing production line.

Embodiment 2

Figure 11:
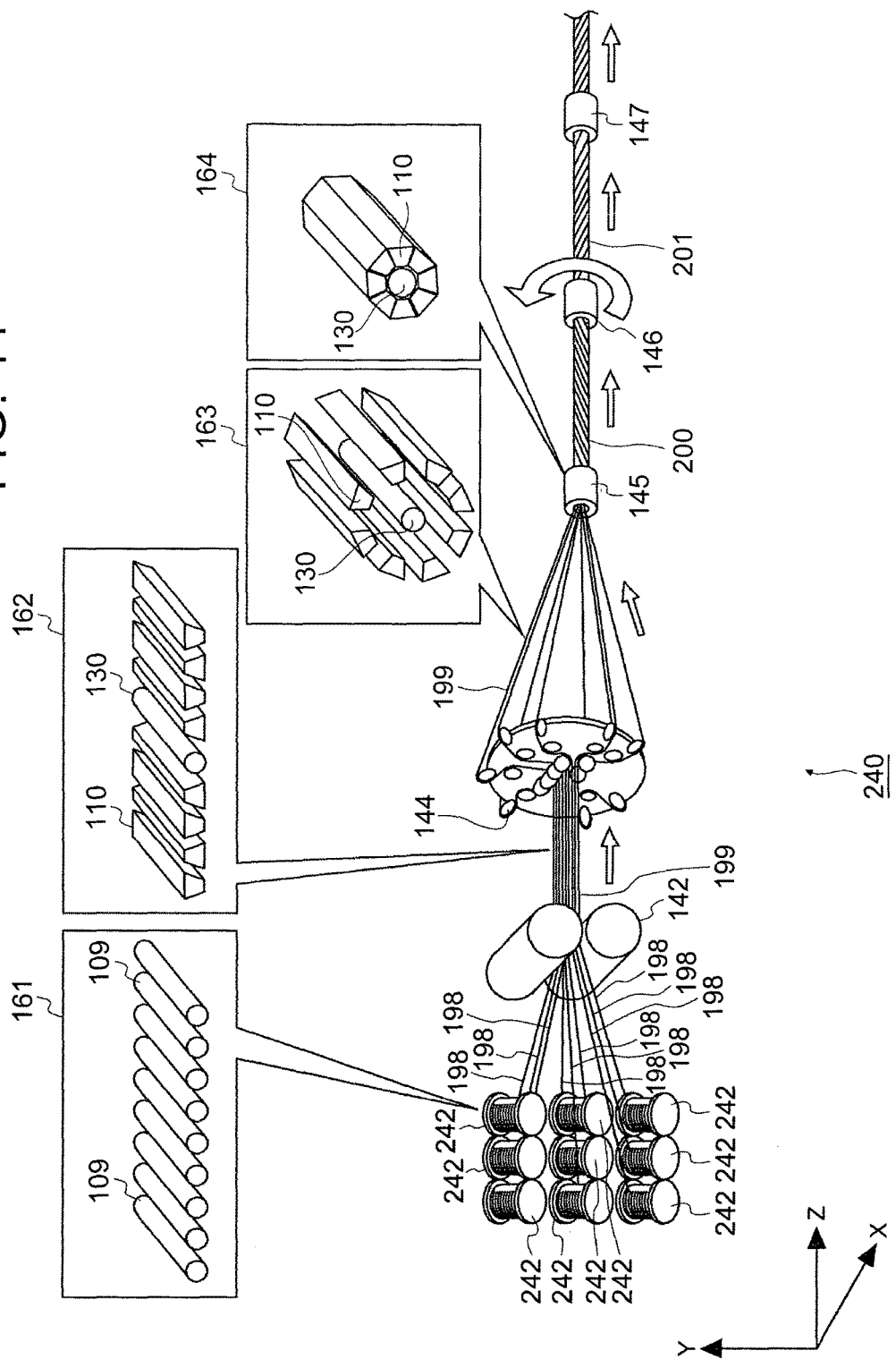
FIG. 11 is a schematic diagram of the manufacturing method of Embodiment 2 of the invention.

Next, the manufacturing method of Embodiment 2 is described with reference to FIG. 11. FIG. 11 is a schematic diagram of the manufacturing method of Embodiment 2. It is found by comparing the manufacturing method of Embodiment 2 with the manufacturing method of Embodiment 1 that they are common except a material supplying machine. Different structures are described. Here, a manufacturing method of continuously manufacturing an assembled conductor 202 (not shown in the figure) from a conductor wire group 198 by using a manufacturing device 240 is described.

A material supplying section 241 includes a plurality of bobbins 242. The conductor wires 109 are wound around the bobbins 242. The material supplying section 241 rotates the plurality of bobbins 242 respectively to transport the conductor wires 109 to the first rollers 142. Next, similar to that in the manufacturing method of Embodiment 1, the single wire rolling process S1 to the finish rolling process S5 are undergone to obtain the assembled conductor 202. The conductor wires 109 have substantially round cross-sectional shapes, and the bobbins 242 have large winding quantities and wind long peripheral wires 110.

Figure 15:
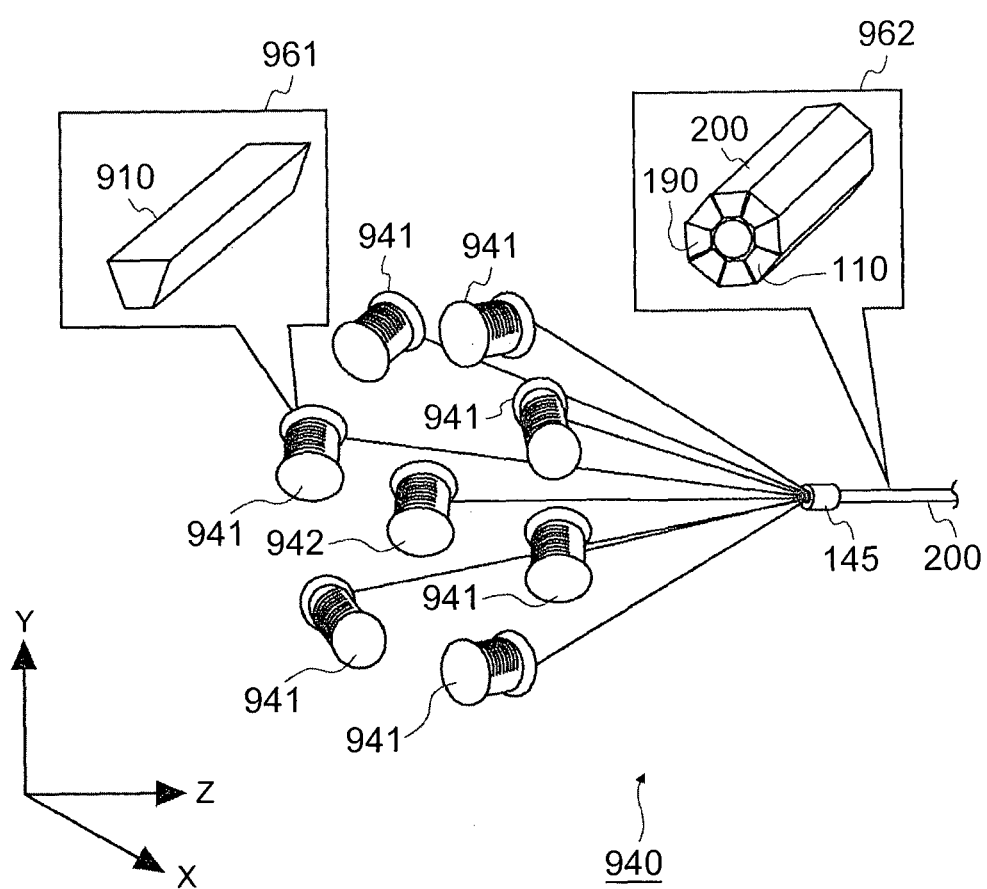
FIG. 15 is a schematic diagram of an associated manufacturing method.

However, there exists a method of manufacturing an assembled conductor as shown in FIG. 15. The manufacturing method as shown in FIG. 15 and the manufacturing method of Embodiment 2 are common except the peripheral wires, the material supplying section, the first rollers and the conveying device. Different structures are described. Here, a manufacturing method of continuously manufacturing an assembled conductor 202 (not shown in the figure) from the central wire 130 and the peripheral wires 910 (described below) by using a manufacturing device 940 is described.

As shown in FIG. 15, the manufacturing device 940 includes one bobbin 942 and a plurality of bobbins 941. If being observed from the clamp 145, the bobbin 942 is arranged on the axis of the central wire 130. If being observed from the clamp 145, the plurality of bobbins 941 are arranged radially by taking the bobbin 942 as the center. The plurality of bobbins 941 are uniformly arranged on an imaginary circle by taking, for example, the position of the bobbin 942 as the center.

The central wire 130 is wound around the bobbin 942, and is supplied to the clamp 145. The peripheral wires 910 are wound around the plurality of bobbins 941, and are supplied to the clamp 145. As shown in the schematic diagram designated by 961, the peripheral wires 910 are wires having substantially trapezoidal cross-sectional shapes.

The clamp 145 receives the central wire 130 from the bobbin 942 and receives the plurality of peripheral wires 910 from the plurality of bobbins 941. The clamp 145 arranges the central wire 130 and the peripheral wires 910 to form assembled conducting wires, which are formed by arranging the peripheral wires 910 around the central wire 130 and bundling them, i.e., an assembled conducting wire bundle 200 (bundle forming process S3). Next, similar to that in the manufacturing method of Embodiment 1, the bundle forming process S3 to the finish rolling process S5 are undergone so that the assembled conductor 202 can be obtained.

In the method of manufacturing an assembled conductor as shown in FIG. 15, the first rollers 142 (see FIG. 2) and the conveying device 144 (see FIG. 2) are not required, and even these parts are omitted, this method can also manufacture an assembled conductor having a high occupation efficiency similar to the manufacturing methods of Embodiments 1 and 2. However, the peripheral wires 910 have substantially trapezoidal cross-sectional shapes. Thus, as compared with the peripheral wires 110 having round cross-sectional shapes, the peripheral wires 910 can hardly overlap to be wound around the bobbins. That is, the winding quantities of the peripheral wires 910 of the bobbins 941 are smaller than the winding quantities of the peripheral wires 110 of the bobbins 242. Thus, in the method of manufacturing an assembled conductor as show in FIG. 15, the work for replacing the bobbins 941 wound with the peripheral wires 910 is more than that in the manufacturing method of Embodiment 2, and the service cost is higher than that in the manufacturing method of Embodiment 2. In addition, in the method of manufacturing an assembled conductor as show in FIG. 15, as compared with the peripheral wires 110 having round cross-sectional shapes, the peripheral wires 910 having substantially trapezoidal cross-sectional shapes have a higher manufacturing cost. Here, the impact of the reduction of the service cost, the manufacturing cost of the peripheral wires and the like is larger than the impact of the increase of the cost caused by the first rollers 142 and the conveying device 144. As can be seen from the above, as compared with the method of manufacturing an assembled conductor as shown in FIG. 15, the manufacturing methods of Embodiments 1 and 2 need the first rollers 142 and the conveying device 144, but the service cost, the manufacturing cost of the peripheral wires and the like are reduced, and as a result, the manufacturing cost of the assembled conductor can be reduced.

Reducing Mechanism of Residual Stresses

Figure 12:
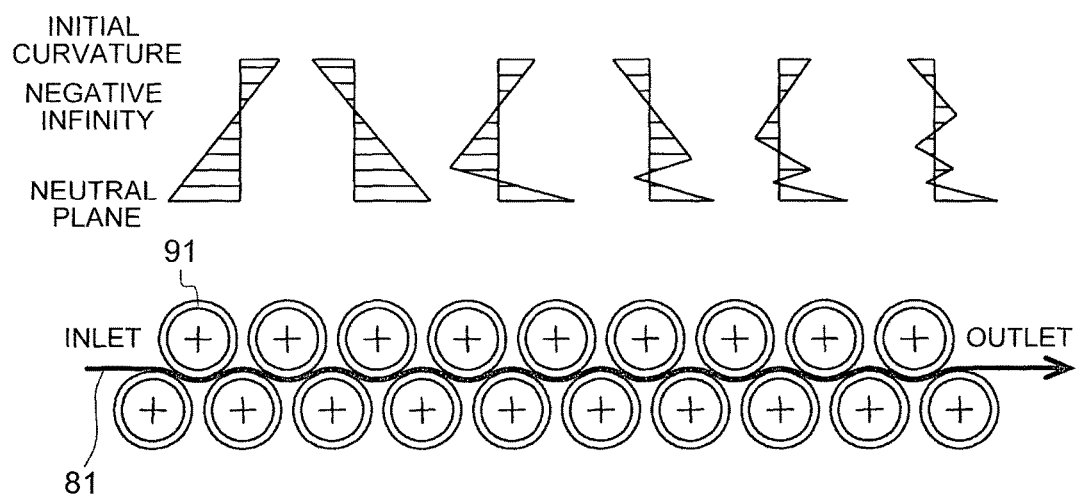
FIG. 12 is a schematic diagram showing a process of plate thickness rolling and distribution of residual stresses in the plate.

Next, FIG. 12 is used to describe a reducing mechanism of the residual stresses. FIG. 12 is a schematic diagram showing a process of plate thickness rolling and distribution of residual stresses in the plate. In the distribution of the residual stresses in the plate as shown in FIG. 12, the residual stresses are point symmetrical with respect to a point in a neutral plane in the width direction of the plate. Thus, FIG. 12 only illustrates the distribution of the residual stresses on a single side of the neutral plane.

As shown in FIG. 12, the plurality of rollers 91 are disposed in a manner that the rollers 91 are opposed to each other. A plate 81 serving as a workpiece passes between these rollers 91 to undergo an application of a bending deformation. As can be seen, consequently, the residual stresses are subdivided from the inlets to the outlets of the rollers 91, and the impact of the residual stresses becomes small at macro level. In addition, even a wire is used in place of the plate 81, the residual stresses within the wire are also reduced.

In the manufacturing methods of Embodiments 1 and 2, bending deformations are applied to the peripheral wires 110 in turn in directions different from one another in the first bending process S21 to the third bending process S23. Thus, it can be deemed that the stresses applied to the peripheral wires 110 triaxially meet the yield condition. Each time a bending deformation is applied, the peripheral wires 110 are all deformed in the direction of the main stress. If the first bending process S21 to the third bending process S23 are undergone in order, the deformations in the direction of the main stress are applied in turn in a manner that the residual stresses in the other directions that have been applied are removed. Thus, in the assembled conductors 202 obtained by the manufacturing methods of Embodiments 1 and 2, the residual stresses are relieved.

In addition, the peripheral wires can be applied with tensile forces up to the proximity to the yield strengths of the materials of the peripheral wires. In addition, the bending radii can be reduced. If the tensile forces and the bending radii are controlled in this way, the residual stresses can be removed from the surface of the peripheral wire to the center of the peripheral wire, which is consequently preferred.

APPLICATION EXAMPLES

Next, a coil can be formed using the assembled conductor obtained by the manufacturing method of Embodiment 1. Thus, this embodiment is applied to the applications below.

A coil formed by the assembled conductor manufactured by the above manufacturing method is manufactured. Consequently, the eddy current loss in such a coil is small, so such an electric motor can also maintain the performance as the electric motor even if it has a small coil.

In addition, an automobile can maintain the existing performance and meanwhile achieve a light weight by possessing such an electric motor. Starting from the viewpoint of the light weight, the automobile preferably possesses a driving section having such an electric motor. Such an electric motor is particularly adapted to a hybrid power automobile and a plug-in hybrid power automobile.

In addition, the invention is not limited to the above embodiments, and proper changes can be made within the scope of not breaking away from the purposes.

What is claimed is:

1. A method of manufacturing an assembled conductor, comprising:
   arranging a plurality of peripheral wires having anisotropic cross-sectional shapes around a central wire;
   bundling the central wire and the peripheral wires that have been arranged, to form a conducting wire bundle; and
   rolling the conducting wire bundle to form the assembled conductor, wherein
   the arranging includes a bending process of bending the peripheral wires respectively in directions along imaginary lines that extend radially relative to an axis of the central wire on an imaginary plane intersecting the axis of the central wire,
   the bending process is a second bending process,
   the arranging further includes a first bending process of bending the plurality of peripheral wires that are arranged in a line in directions intersecting the radially extending imaginary lines before the second bending process, and
   in the second bending process, the plurality of peripheral wires are bent at positions where the peripheral wires intersect the imaginary lines.

2. The method of manufacturing the assembled conductor according to claim 1, wherein
   the arranging further includes a third bending process of bending the plurality of peripheral wires from positions on the radially extending imaginary lines toward the axis of the central wire, after the second bending process.

3. The method of manufacturing the assembled conductor according to claim 1, wherein
   in the first bending process, one or more peripheral wires included in the plurality of peripheral wires are bent in a first direction of the imaginary plane, and the remaining peripheral wires included in the plurality of peripheral wires are bent in a second direction opposite to the first direction.

4. The method of manufacturing the assembled conductor according to claim 1, wherein
   in at least one of the processes of bending the peripheral wires, rollers are used to bend the peripheral wires.

5. A method of manufacturing an assembled conductor, comprising:
   arranging a plurality of peripheral wires having anisotropic cross-sectional shapes around a central wire;
   bundling the central wire and the peripheral wires that have been arranged, to form a conducting wire bundle;
   rolling the conducting wire bundle to form the assembled conductor,
   wherein the arranging includes a bending process of bending the peripheral wires respectively in directions along imaginary lines that extend radially relative to an axis of the central wire on an imaginary plane intersecting the axis of the central wire; and
   machining the cross-sectional shapes of the peripheral wires into the anisotropic cross-sectional shapes before the arranging,
   wherein the anisotropic cross-sectional shapes are trapezoidal shapes.

6. The method of manufacturing the assembled conductor according to claim 5, wherein
   the plurality of peripheral wires are wound around bobbins and are supplied from the bobbins, before the machining the cross-sectional shapes of the peripheral wires into the anisotropic cross-sectional shapes.

7. An electric motor comprising a coil formed by the assembled conductor manufactured by the method of manufacturing the assembled conductor according to claim 1.

* * * * *